Figure 1:
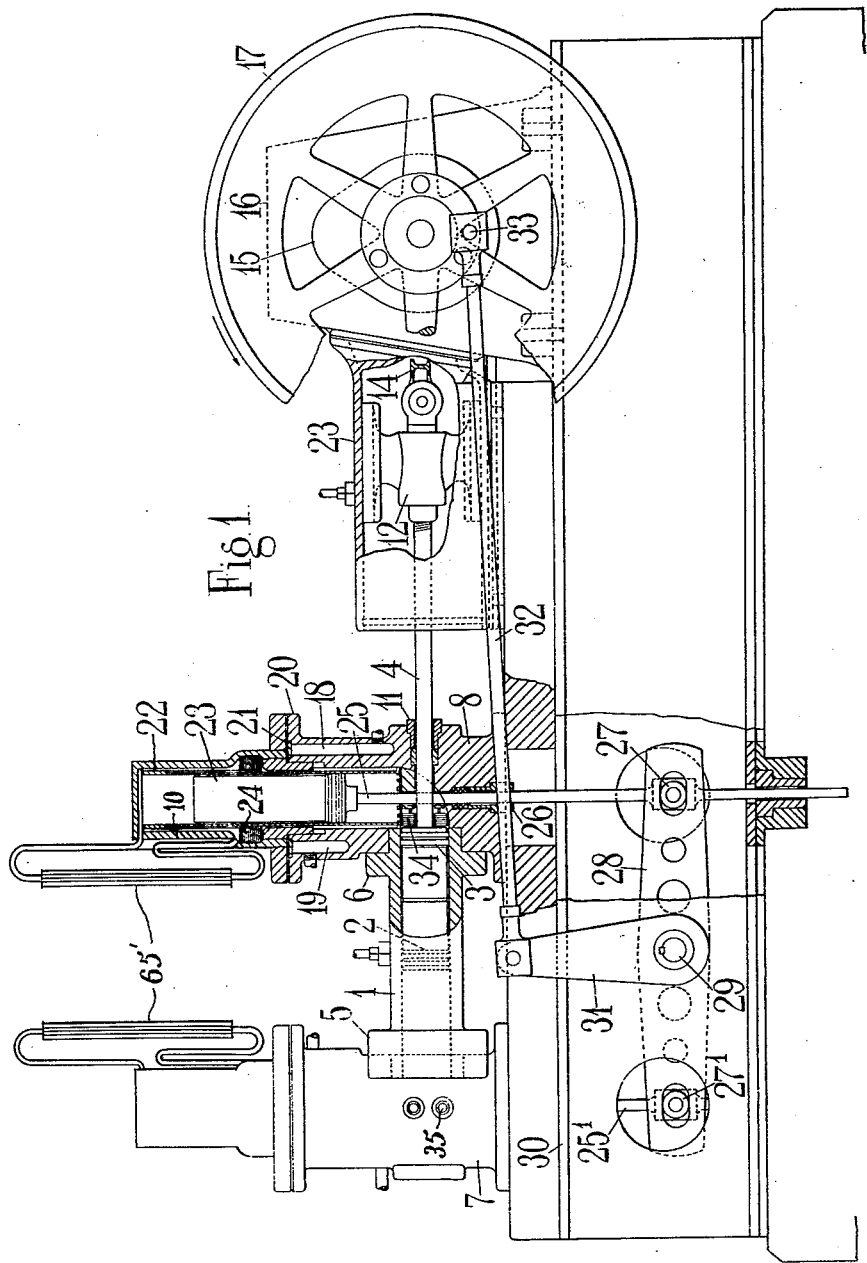

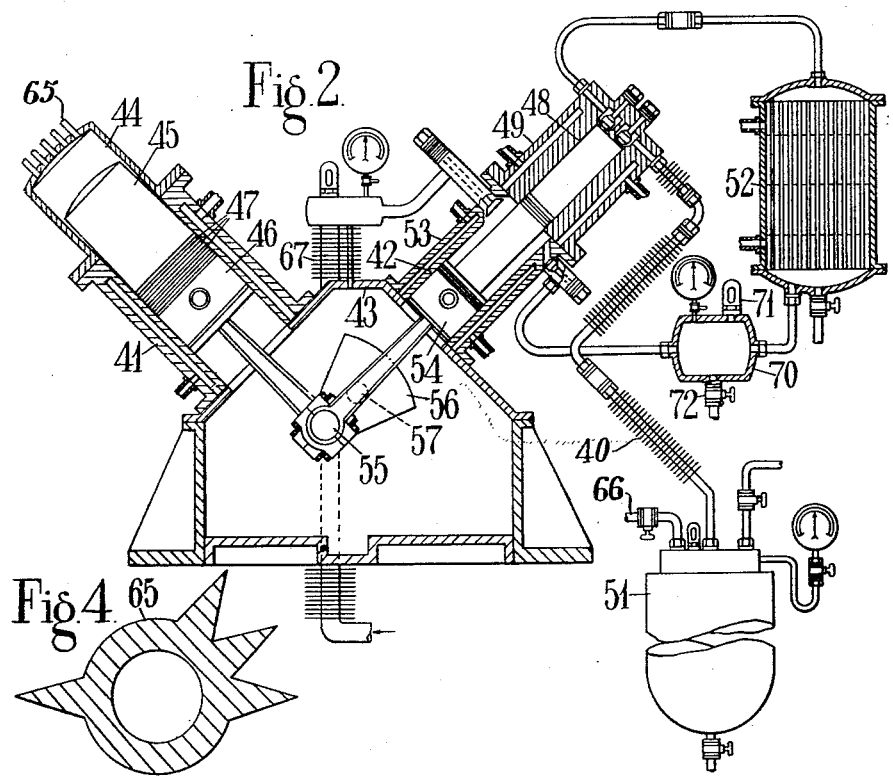

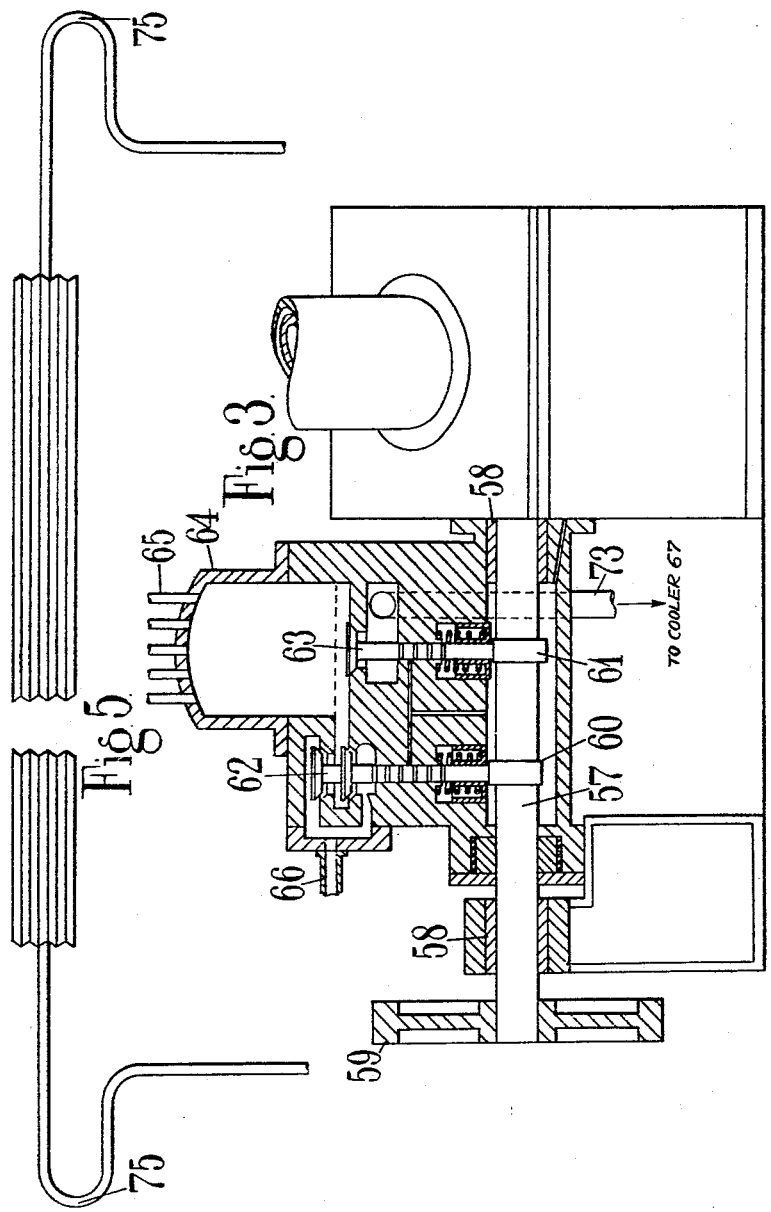

United States Patent Office 3,009,315
Patented Nov. 21, 1961

3,009,315
HEAT ENGINES OPERATING ON THE STIRLING OR ERICSSON HEAT CYCLES
James Joseph Drumm, Dublin, Ireland, assignor to Energy Limited, Dublin, Ireland
Filed Jan. 19, 1956, Ser. No. 560,252
1 Claim. (Cl. 60—24)

This invention relates to heat engines working on either the Stirling or the Ericsson heat cycle which are closely related to one another and which for the purposes of this invention differ merely with respect to the character of heat input. While in an engine working on the Stirling Cycle all the heat input to its working fluid takes place at constant volume, in such an engine, modified so as to work on the Ericsson Cycle, the working fluid would receive all its heat under conditions of constant pressure. Both classes of engine can be further classified as external combustion engines of the kind in which heat is absorbed by and stored in a regenerator and the medium is subsequently compressed, after which it is returned to the working space or chamber through the regenerator from which it takes back the heat previously rejected. The original engine of this type employed air as the working medium and the thermal efficiency realised in practice was very low. It is one of the objects of the present invention to provide an improved engine of the above kind having a greatly improved efficiency and or relatively simple construction which is reliable in operation.

This invention is mainly concerned with the internal or thermodynamic working cycles of the engines described herein, and it does not take into account the external combustion cycle of the fuels used as a source of heat for operating such engines. Any of the well known methods of burning fuels in a supply of air may be employed, together with recuperation or recovery of the waste heat carried away in the flue gases, or exhaust products of combustion.

The invention comprises an engine of the kind referred to wherein the working medium is a dehydrated gas or a mixture of dehydrated gases.

The invention also comprises an engine of the kind referred to in which the working medium is a gas having greater heat transmission properties than those possessed by air at the high temperatures reached in the engine and in which the upper temperature limit of the working cycle approaches 780° C.

The invention also comprises an engine of the kind referred to in which the working medium is either carbon dioxide gas or helium gas, or both.

The invention also comprises an engine of the kind referred to in which the working medium is carbon dioxide gas with or without admixture of any or all of the gases helium, argon, neon, or nitrogen.

The invention also comprises an engine of the kind referred to in which when working on the Stirling heat cycle a working medium is employed with a high upper temperature limit of the working cycle, e.g. up to 750° C., and in which means is provided between the cold and hot working parts of the engine to prevent the passage of lubricant from said cold parts to the hot parts and thereby reduce or eliminate clogging of the primary regenerator by soot and other deposits.

The invention also comprises an engine of the kind referred to in which when working on the Stirling heat cycle a working medium such as one or more of those previously indicated, is employed with a high upper temperature limit of the working cycle, e.g. up to 750° C., and in which a secondary regenerator is provided between the entrance to the working cylinder and the adjacent cold space and capable of storing an appreciable amount of heat from a cold compression phase which heat is absorbed again by the expanding gas, whereby the brake horse power of the engine is increased. In a preferred arrangement according to the invention, the secondary regenerator comprises fine metal wire gauze or fine wire and is also adapted to act as a means or filter for preventing lubricant from the cold working parts, i.e. the piston and cylinder, from penetrating to the hot parts and thereby causing a deterioration in the efficiency of the primary regenerator by carbon or like deposits therein.

The invention will be more completely understood from the following detailed description which is given in conjunction with the accompanying drawings, in which:

FIGURE 1 is a sectional elevation of a double acting heat engine working on the Stirling Cycle, FIGURES 2 and 3 are sectional side and end views respectively of a heat engine working on the Ericsson Cycle, FIGURE 4 is an enlarged cross-sectional view of one of the tube elements of the tubular heaters, and FIGURE 5 is an enlarged longitudinal view of a complete heater tube element showing the circular bends near the ends, which are provided for relieving distortion caused by the thermal expansion of these tubes when heated from room temperatures to 800° C.

Referring first to FIGURE 1 of these drawings, there is provided a working cylinder 1 in which is slidable a double acting piston comprising a pair of piston heads 2, 3 screw threaded to a piston rod 4 and spaced apart by an interposed sleeve. The cylinder 1 is formed with external flanges 5, 6 near the ends thereof and these ends are fitted into cylinder end castings 7, 8 having branch connections for communication with two displacer cylinders 9, 10 which are disposed at each end of the working cylinder 1 with their axes at right angles thereto. The piston rod 4 extends through a suitable gland 11 in one of said end castings 8 and is screw threaded to a cross head 12 slidable in guides, the whole being carried on a baseplate. The cross head 12 is connected by a rod 14 to a crankshaft 15 enclosed in a crankcase 16, and one or a pair of flywheels 17 is or are screwed to the crankshaft 15. The aforesaid cylinder and castings 7, 8, which may conveniently be formed of bronze, extend at right angles to the working cylinder axis and constitute cold chambers, and they are formed with water jackets for this purpose, the jackets being supplied with cooling water in any convenient manner. Into the upper end of each of said cold chamber castings is screw threaded a cylinder 9, 10 of heat resisting alloy, closed at its upper end, and constituting a hot chamber. The cylinder 10 is shown in section, and it will be seen from this that the water jacket spaces 18, 19 open into the upper flanged ends 20 of the aforesaid castings and are closed by an attached ring or annular plate 21. The upper part of these hot chamber cylinders may be provided with exterior ribs if desired. The upper part of each hot chamber cylinder and also the lower part thereof and the lower part of the cold chamber casting are provided with interior sleeves or liners 22 within which slide the displacer piston 23 which is of hollow cylindrical shape and is formed of suitable heat resisting alloy, preferably the same as that of the hot chamber cylinders. The space between the two aforesaid sleeves or liners is occupied by the primary regenerator material which preferably comprises a series or stack of thin perforated discs or rings 24 formed from Monel metal wire gauze of 200 mesh. Alternatively compact coils of fine wire of suitable metal may be employed. It will be understood that each of the above described lower liners opens into the space at the end of the working cylinder 1. Each displacer piston is attached to an operating rod 25, $25^1$ which extends downwardly through a suitable gland 26 in the lower part of the cylinder end casting and is pivotally connected by a link or swivel 27 to one end of a rocking beam 28 pivotally mounted at its centre 29 on the lower part of the baseplate 30. An arm 31 connected to the rocking beam is connected by a rod 32 to a cam follower 33 which is arranged to be actuated by a suitably formed cam on the crankshaft 15 whereby the displacer pistons perform alternate up and down motions appropriate to the stages of the Stirling Cycle. Assuming that the working medium is to be carbon doixode, this is fed from the usual storage cylinders through a reducing valve (not illustrated as it is not part of the device) and thence through openings 35 in the castings 7 and 8 to the two ends of the working cylinder. The gas which is preferably dehydrated may be supplied to the cool cylinder at any desired pressure up to a maximum of 400 lbs. per square inch.

There is also provided between each of the working cylinder spaces, i.e. the ends of the working cylinder, and the adjacent cold space, i.e. the lower part of each displacer cylinder, a secondary or auxiliary regenerator which may comprise a series of fine mesh gauze rings or discs 34 as described for the primary regenerator, or may comprise coils of fine wire, for example Nichrome wire of 50 I.W.G. wound into compact coils. The purpose of this secondary or auxiliary regenerator is twofold. In the first place it is enabled to store an appreciable amount of heat from the cold compression phase of the cycle of operations and this heat is absorbed again by the expanding gas, thereby increasing appreciably the useful work obtainable during the expansion or power stroke. In the second place, the secondary regenerator acts as a baffle or collector of the oil or lubricant from the working cylinder 1 and prevents this from reaching the hot chambers where it would otherwise be cracked and deposited as soot or other products and would necessarily seriously impair the action of the primary regenerator 24. The secondary regenerator 34 thus acts as a filter for the lubricant, which is generally in mist form, carried over from the working cylinder 1 and it may readily be arranged that the lubricant so collected is drained off into a sump provided for the purpose.

It will be understood that the external heat required to operate the engine can be applied to the upper ends of the displacer cylinders in any convenient manner, as for example by suitably arranged burners in combustion chambers (not illustrated), or by furnace or industrial waste gases which are caused to pass through a chamber surrounding the upper ends of the displacer cylinders to constitute a heat exchanger. As previously mentioned, the upper ends of the displacer cylinders may be ribbed externally to assist in the desired heat exchange.

The cycle of operation of the engine will now be considered on the assumption that in a particular example the maximum temperature $T_1$ attained by the working fluid is 750° C. (1382° F.) and the minimum temperature $T_2$ is 50° C. (122° F.). The ideal efficiency calculated for these temperature limits is 68.5%. In the first stage of the cycle the gas may be considered to expand isothermally in the cylinder space through a ratio of 2 taking in the quantity of heat necessary for the mechanical work performed. For each mass of one pound of gas taking part in the actual expansion, the work performed during one complete crankshaft revolution is $R/J \times T_1 \log_e r$ in B.t.u. heat units, where R is the gas constant for each pound of the gas in foot pounds, J is Joule's equivalent, i.e. 778 foot pounds per B.t.u., $r$ the expansion ratio—in this case 2—and $T_1$ is the absolute temperature in F. or degrees Rankine—in this case 1,842 degrees F. absolute. The energy stored in the flywheels during this stroke carries the engine through the remainder of the cycle. In the second stage the carbon dioxide passes at a constant volume through the regenerator, its temperature falling from $T_1$ to $T_2$. The amount of heat stored in the regenerator is $eC_v (T_1-T_2)$ where $C_v$ is the specific heat of the gas and $e$ the efficiency of the generator which is taken as 97%. In the third stage the carbon dioxide is compressed isothermally by the engine piston to its orginal volume V. The amount of heat rejected per crankshaft revolution, principally to the water jacket, is $$\frac{R}{J} T_2 \log_e r$$

for each pound of gas compressed where $T_2$ is the absolute temperature in F. degrees, and is the equivalent of the energy taken from the kinetic energy of the flywheels, omitting consideration of the secondary regenerator. In the fourth stage the carbon dioxide is passed back at constant volume through the regenerator to the hot space, its temperature rising from $T_2$ to $T_1$. The amount of heat taken in from the regenerator is $eC_v (T_1-T_2)$. The deficit of heat owing to imperfections in the regenerator is $C_v(T_1-T_2)(1-e)$ which deficiency is made good from the heater. It can be shown by calculation that using carbon dioxide as the working medium and with a primary regenerator of 97% efficiency the maximum efficiency of the cycle working between the thermometer temperatures of 750° C. and 50° C. is 60.2%.

It will be understood that the foregoing figures represent merely ideal or theoretical efficiency, and that under suitable conditions, more especially when tubular heaters are used as hereinafter described, the upper limit of working temperature attained by the working gas may be as high as 780° C., and that in some cases the working pressure may be reduced to 150 p.s.i. gauge. In an actual engine of the design just described, however, the cycles of compression and expansion of the working fluid deviate somewhat in character from that of a purely isothermal process, and due to unavoidable mechanical losses (fluid friction) in the working fluid, in addition to the usual frictional losses in sliding and moving parts of the machine, and parasitic heat losses, due to radition from the machine as a whole, as well as due to direct conductivity losses from the internal hot to cold parts, the actual working or brake horse power efficiency, would be lower by an amount depending on the actual mechanical efficiency of the particular engine at any time under consideration. With the use of the previously described secondary, or Joule heat regenerator, such losses are, however, mitigated by an amount of 2.5% approximately. For small engines of a few horse power E, the mechanical efficiency might be as low as 70% whilst for larger engines of 50 H.P. or more, E could be 80% to 85%. Thus for a 50 H.P. engine a brake horse efficiency of $60 \times 0.8 + 2.5\% = 50.5\%$ would be expected.

In the above described example the speed of rotation of the engine is about 500 R.P.M. and the double acting piston has a stroke of 4½". The crank shaft and bearings are splash lubricated from a crankcase and the working piston is fed with high pressure oil from a suitable pump driven by the engine. In order to retain the gas in the working system suitable glands are fitted to the piston rod and to the displacer rods. These glands may be of Trist fibre for example. The hot chambers may be formed from a suitable heat resisting alloy which has a high degree of freedom from scaling or oxidation corrosion at the high temperatures employed, with desirable strength and creep factors. The angle between the working piston crank and the displacer piston crank is approximately 90°.

The phase difference between the points of rotation corresponding to maximum hot volume and maximum cold volume respectively corresponds to 135° of a complete crankshaft revolution.

A suitable alloy for the hot chambers might have the following composition—carbon 0.4%, manganese 0.8%, silicon 1.0%, nickel 13.0%, chromium 13.0%, cobalt 10.0%, molybdenum 2.0%, niobium 3.0%, tungstern 2.5%, iron (Fe) balance.

When the chamber is made of this material, however, it is preferable to modify its construction so that its walls are subjected only to hooping stresses alone instead of to the combination of hooping stresses and the (much) greater thermal stresses. This can be satisfactorily achieved by separating the exterior top of the hot chamber from the hot entrance to the regenerator by a series of metal tubes 651 made of the same alloy as seen in FIG. 1. These tubes in the example given would be of an outside diameter of something like 0.32 inch and of 0.1 inch internal bore. They would be ribbed along those parts of their lengths exposed to the hot gases of the combustion chamber so as to provide the necessary extra surface for efficient heat intake from the burner gases.

In the example above a complete tubular heater assembly for each hot chamber would consist of 35 tubes (70 in all for the complete engine) with their tops welded into the exterior top of each pot and their lower extremities welded into the hot entrance of the regenerator. The ribbed length of each tube would be approximately 13 inches. In order to prevent destructive distortion in the several tubes of a completely assembled heater, which distortion would be caused by the linear expansion of each tube when raised from cold to 800° C., the tubes near their extremities are given a circular bend as shown in FIGURE 5.

It is to be understood that the invention is not to be regarded as being restricted to the example described, since it is evident that details of the working parts of the engine could be widely varied.

It is also to be understood that a plurality (four or more) of working cylinders may be arranged in any suitable manner, so that their working pistons are operatively associated with a common crankshaft, or, alternatively, are suitably connected to a wobble plate method of drive. If desired, each cylinder may be double acting in the sense that it is consisted of a hot chamber bolted on to its top and a displacer piston correspondingly bolted on to its working piston. The top of each hot chamber, for gaseous conductivity purposes, is connected by a suitable tube to the bottom of the next cylinder assembly whose piston works at a 90° difference of crankshaft angle from its own. Where a crankshaft method of drive is chosen, however, the cylinder units should be mounted in pairs, each pair constituting a 90° V formation. Any number of banks of such V formations can be assembled one behind the other on a common crankcase, and with their several pairs of connecting rods connected to a common crankshaft.

Furthermore while it is preferred to use carbon dioxide as the working fluid, it is to be understood that this gas may be substituted by or used in conjunction with one or more of the inert gases such as nitrogen, helium, argon or neon, care being taken to insure that all gases are completely dry.

Referring now to FIGURES 2, 3 and 4, a modified form of engine is shown which is adapted to work on the Ericsson heat cycle. In this modification the engine has two piston swept cylinders 41 and 42 placed in right angled V formation on the crankcase 43 which is pressurized to approximately 240 lbs. per square inch. This crankcase is of built up construction and is made from steel of 0.40% carbon and 0.45% manganese, the steel having been made in a basic open hearth furnace. One cylinder 41 of the formation is a working unit while the other cylinder unit 42 functions as a two stage compressor. The working cylinder assembly consists, in its upper part, of a hot chamber 44 fitted with a loose fitting light displacer piston 45. At its lower end the hot chamber 44 is bolted to the water-jacketed cast iron cylinder 41 which has the same internal bore as the hot chamber 44. The cast iron used in the construction of 41 is preferably an alloy iron of high tensile strength. A closely fitting working piston 46 of cast iron with rings 47 slides in the accurately machined cast iron cylinder 41. The light displacer piston 45 as well as the hot chamber 44 are each made of the alloy described in connection with FIGURE 1. The displacer piston 45 is hollow and is filled with an inert light powder such as magnesium oxide or microporous silica (silica aerogel), both of which are good high temperature insulators. The displacer piston 45 is secured firmly to the top of the working piston 46 so as to form at their junction an integrated unit of the same diameter. The displacer piston 45 tapers slightly from its bottom junction with the working piston towards the top of the hot cylinder 44.

The compressor cylinder assembly consists in its upper part of a high pressure cylinder 48 surrounded by a water-jacket 49. The intercooler 40 connects 48 through a pipe, indicated in FIGURE 2, with the gas storage bottle 51. The water-jacket 49 has separate inlets and outlets for circulating cooling water. The lower end of this high pressure cylinder 48 is secured by a flanged end part to the upper end of the main part 42 of the intermediate cylinder, the latter being surrounded by a water-jacket 53 also provided with separate inlets and outlets for the circulation of cooling water. A pressure equalising tank 70 fitted with a safety valve 71 and a blow-off cock 72 is connected between the first and second compression stages, the connection being completed through the cooler 52. The compressor piston 54 mounted in 42 is connected, at its upper end, with the high pressure compression piston, the latter sliding in its cylinder 48. Both compression cylinders are made of a high tensile cast iron and the integrated piston is made of cast iron. The connecting rods or both the working piston 46 and the compressor piston 54 have their big ends mounted on a common crankpin 55 carried on a common crankshaft on which is mounted a counterweight 56, the weight of which at its centre of gravity is approximately equal to the sum of the weight of both piston big ends, plus crank pins plus cranksides plus the weight of one piston, piston pin and connecting rod, less the weight of its big end, it being understood that each piston assembly with its connecting rod is substantially equal in weight and substantially of the same radial length. The crankshaft 57 is mounted in bearings 58 (FIG. 3) and carries a flywheel 59 and a pair of cams 60 and 61 for operating a pair of valves 62 and 63 disposed in the base of the regenerator 64 from which a set of heater tubes 65 lead through a combustion chamber to the upper end of the hot chamber 44 of the working cylinder. The regenerator 64 also has an inlet tube 66 leading to the gas storage chamber 51 and an outlet tube 73 leading to the cooler 67. Conveniently, the regenerator is loaded with fine metal gauze and the heater tubes, of which there are 70 each with a ribbed length (see FIGURE 5) of 24 inches, have a cross sectional shape as shown in FIGURE 4, and are preferably arranged as shown in FIGURE 5, the circular bends 75 being provided for relieving distortion caused by thermal expansion. Lubrication is provided for cams 60 and 61, and for the two compressor cylinders, their pistons, and inlet and outlet valves.

The combustion chamber not illustrated may be of any convenient form and is thermally insulated over its exterior by a layer of microporous silica preferably approximately two inches in depth, the hot chamber and upper parts of the regenerator are similarly insulated over their outer surfaces by a similar layer of microporous silica, the latter substance in all cases being contained in a bright aluminium jacket. The wall of the combustion chamber which have to withstand a temperature of 850° C. are made of a special heat resisting alloy of the requisite strength of 850° C. and of good nonscaling properties up to a temperature of 1100° C. in the furnace gases. The composition of this alloy is: nickel 20%, chromium 25%, silicon 1.5%, carbon 0.15%, balance iron. The inner wall of the hot chamber, throughout its length, is thermally insulated by means of a layer of microporous silica of ¼″ thick contained in a suitably sealed canister of an alloy such as stainless steel of the kind commonly known as 18/8. This canister is made to fit securely along the inside of the vertical walls of the hot chamber throughout their length, but in such a way as to allow at all times unrestricted movements of the displacer piston.

It is to be understood that the alloy used in the construction of the hot chamber of the engine is the same as that used in the hot chambers of the engine described in connection with FIGURE 1, the tubular heaters also being formed of the same alloy. The regenerator conveniently consists of 200 mesh Monel metal gauze and is constructed of a plurality of discs stamped out of the same gauze and packed tightly into the cylindrical cylinder of the regenerator assembly.

In operation, carbon dioxide at a pressure varying from 240 lbs. to 800 lbs. per square inch (absolute in both cases) and at an average temperature of 38° C. is used as the working gas. When compressed in two stages to 800 p.s.i., the gas is passed to the storage bottle 51 whence the engine draws the correct quantity of gas for each hot expansion stroke. Gas entry and ejection of each cycle in the hot chamber are controlled by the pair of cam operated valves 62 and 63, the profile of each cam being so drawn as to give the correct timing in the opening and closing sequence of each valve, these cams being operated by the crankshaft so as to open and close once during each engine or crankshaft revolution.

On opening the high pressure inlet valve, the cold gas passes at a pressure of 800 p.s.i. through the regenerator of 98% thermal efficiency and through the tubular heater 65, the metal walls of which are typically at a temperature of 800° C., to the top of the hot chamber 44. The inlet valve promptly closes when the equivalent of one volume of gas has entered the hot chamber. This volume of gas, now at a temperature of 780° C., is allowed to expand to 4.34 volumes reckoned on hot chamber volume only. The true volume of gas taking place in this expansion is the sum of the volume of gas contained in the tubular heater channels and interstices of the tightly packed regenerator plus the volume of gas let into the expansion cylinder itself at the beginning of the expansion process. The corrected volume comes out in this case at 1.44 and the true ratio of expansion becomes 3.32. In the act of expanding, the gas pushes down the working piston performing useful work.

In the present case, the hot expansions comes close to being an isothermal process. Taking the regenerator efficiency to be I, the work performed per engine revolution in the expansion cylinder per lb. of gas actually taking part in the expansion is given by the expression $RT_1 \log_e r$, where R again is the gas constant for 1 lb. of gas carbon dioxide, and $T_1$ is the absolute temperature at which the expansion takes place—in this case 1,052° Kelvin or 1,895° F. absolute, the expansion ratio $r$ is 3.32.

The compression process is performed in two stages, each stage having the same ratio of expansion viz. the square root of $r$ which is 1.82. Again assuming the compression process as a whole to come sufficiently near being isothermal in character, it can be shown that the total work necessary to perform the entire process is given by the expression $RT_2 \log_e r$. In this case $T_2$ is 310° Kelvin or 560° F. absolute.

The gas, carbon dioxide, whilst agreeing closely in behaviour with that of a perfect gas at temperatures of 780° C. or higher, deviates considerably from such behaviour at temperatures around 38° C. or lower. At such lower temperatures, carbon dioxide is considerably more compressible than a perfect gas, and the work necessary for compressing it to a smaller volume is considerably less than that represented by the expression $RT_2 \log_e r$. This deviation in perfect gas behaviour in the case of carbon dioxide at the lower engine temperatures increases appreciably the overall efficiency of the engine.

The form of heat engine working on the Ericsson Cycle just described is found to have the following particulars:

*Tubular heaters*

(a) Pressure loss between ends of heater is 6.4 lbs. per sq. inch at the engine speed of 960 r.p.m. and 800 lbs. p.s.i.

(b) Nusselt number for heat transmission to the working fluid at 800 lbs. p.s.i. from the walls of the heater at a wall temperature of 800° C. is 430 B.t.u. per hour per square foot per degree F.

(c) Thermal stress in heater walls at full under conditions of full load on engine less than 700 lbs. p.s.i.

*Coolers*

(d) Pressures loss in intercooler No. 40 is 6.7 lbs. p.s.i.
(e) Pressure loss in intercooler No. 52 is 4 lbs. p.s.i.
(f) Pressure loss in intercooler No. 67 is 4.6 lbs. p.s.i.
Total pressure losses in coolers is 15.3 lbs. p.s.i.

Total pressure losses in tubular heaters plus intercoolers is 21.7 p.s.i., or about 4% of average pressure 520 lbs. p.s.i. Hooping stresses are negligible.

In the case of large size engines constructed in accordance with the invention, the design may be simplified for those working on the Ericsson heat cycle. Thus two identical expansion units may be assembled in right angled V formation with their identical pistons and connecting rods working on a common crankpin, with the appropriate counterbalancing weight. The interior diameter of an expansion cylinder may be as large as 20 inches and the piston stroke anything up to 20 inches also. Two regenerators, each with its own combination of cams operated in the usual way from the crankshaft, would be employed. The compressor could be of a specialised design driven from the crankshaft at any speed ratio found most suitable.

For engines of the largest design, four or more identical expansion units could be assembled in right angled V formation on a common crankshaft as above. Here, however, only two sets of regenerators would be necessary, as each regenerator complete with its cam combinations could be made to serve two or more expansion units. The tubular heaters from any number of expansion units could have their heater tubes all welded into the common top of one regenerator. For such an engine one compressor unit could be employed and driven from the common crankshaft at any suitable gear ratio. For these latter large engines an "isothermal" centrifugal compressor, now commercially available, could be driven at a requisite speed of, say 2,800 r.p.m. through a suitable gear up ratio from the common crankshaft.

I claim:

A heat engine of the external combustion type comprising a working cylinder having a double acting piston slidable therein, a heat absorbing and heat storing regenerator means, a displacer cylinder mounted substantially at right angles to said working cylinder at each end of said working cylinder, each of said displacer cylinders comprising a hot chamber and a cold chamber communicating with said working cylinder through said cold chambers, a displacer piston slidable in each displacer cylinder, a rocking beam operatively connecting said displacer pistons, power take off means operatively connected to said double acting piston and to said rocking beam, the regenerator comprising a primary regenerator disposed between the hot and cold chambers of each displacer cylinder, and a secondary regenerator disposed between the cold chamber of each displacer cylinder and the working cylinder, said secondary regenerator being adapted to prevent the passage of lubricant from the working cylinder to the displacer cylinder in addition to their heat storage function, means for supplying a working medium to the working cylinder through said primary regenerator, means for compressing the working medium, and a source of heat external to said cylinder for supplying heat to the working medium at each said hot chamber, said working medium comprising a mixture of dehydrated carbon dioxide and helium whereby high upper working temperatures may be achieved.

References Cited in the file of this patent

UNITED STATES PATENTS

| | | |
|---|---|---|
| 36,008 | Kritzer | July 29, 1862 |
| 155,087 | Hirsch | Sept. 15, 1874 |
| 334,153 | Babcock | Jan. 12, 1886 |
| 1,037,190 | Anderson | Sept. 3, 1912 |
| 1,764,110 | Lundgaard | June 17, 1930 |
| 1,788,558 | Baum | Jan. 13, 1931 |
| 2,272,925 | Smith | Feb. 10, 1942 |
| 2,590,519 | Du Pré | Mar. 25, 1952 |
| 2,616,243 | Van Weenen | Nov. 4, 1952 |
| 2,621,474 | Dros et al. | Dec. 16, 1952 |
| 2,657,528 | Jonkers et al. | Nov. 3, 1953 |
| 2,746,241 | Dros et al. | May 22, 1956 |
| 2,764,879 | De Lange | Oct. 2, 1956 |